May 26, 1942.   A. V. MANDEKIC   2,284,220

LOCKING DEVICE FOR VEHICLE WHEELS

Filed Oct. 31, 1941

INVENTOR
Anthony V. Mandekic
BY Robt. W. Pearson
ATTORNEY

Patented May 26, 1942

2,284,220

UNITED STATES PATENT OFFICE 2,284,220

LOCKING DEVICE FOR VEHICLE WHEELS

Anthony V. Mandekic, Los Angeles, Calif.

Application October 31, 1941, Serial No. 417,367

7 Claims. (Cl. 188—31)

This invention relates to a locking device for vehicle wheels.

The invention may be used to lock against rotation the wheels of various kind of vehicles, but is more particularly intended for being used upon the wheels of hand operated trucks.

Among the objects of the invention are to provide an exceedingly simple means for positively locking truck wheels against rotation; to provide in combination with other features of the invention, improved means for keeping the locking element in or out of its locked position; and to provide for hand operable trucks a wheel locking means which the user can adjust manually with minimum interference in regard to the use of his hands to propel the truck.

Other objects, advantages and features of invention will hereinafter appear.

Referring to the accompanying drawing, which illustrates what is at present deemed to be a preferred embodiment of the invention, Fig. 1 is a side elevation of a hand operable truck, equipped with the invention, parts being broken out to contract the view. This view is partly sectioned on line 1—1 of Fig. 2.

Figure 1:
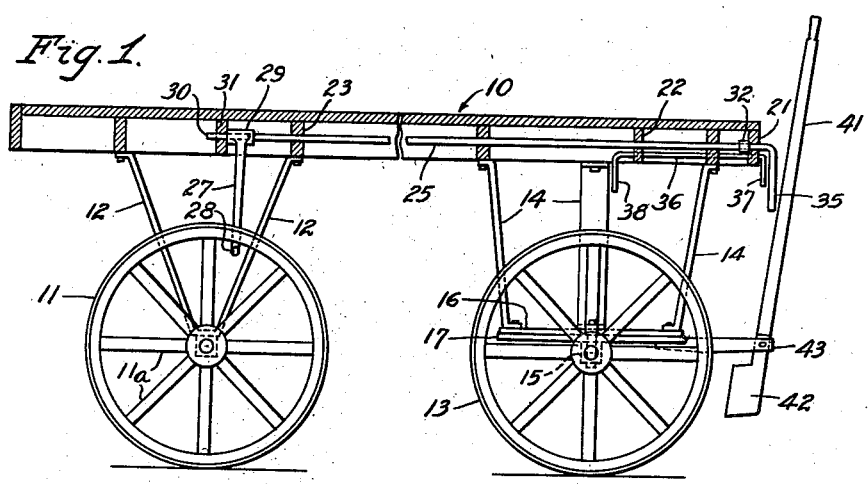
Figure 2:
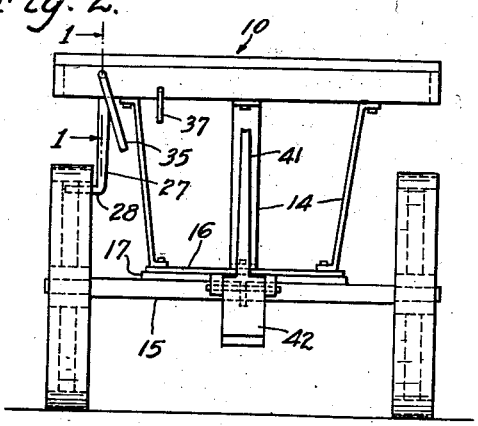
Fig. 2 is a front elevation of Fig. 1.
Figure 4:
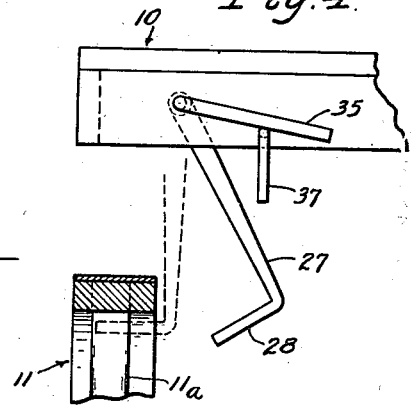
Fig. 4 is an elevation looking at the right hand end of Fig. 3. A portion of the wheel being locked is shown in section, the locked position of the device being indicated in dotted lines.
Figure 3:
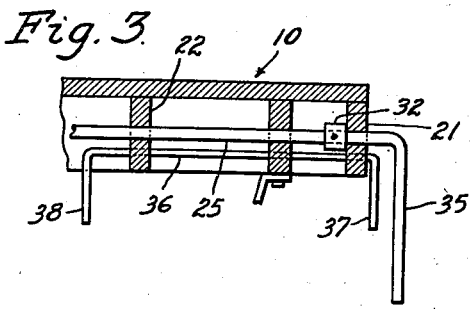
Fig. 3 is a reproduction on an enlarged scale of a fragment of the right hand portion of Fig. 1, in order to illustrate more clearly the means for releasably mounting the locking rod in the wheel locking position.

Referring in detail to the drawing, the hand truck shown comprises a frame having a platform portion 10, rear wheels 11, rear supporting rods 12, front wheels 13 and front supporting rods 14. The axle 15 of the front wheels supports a conventional fifth wheel structure with a non-rotatable upper plate 16 and a turnable lower plate 17.

Underlying the platform or truck bed 10 are transversely extending front cross-pieces 21 and 22, and rear cross-pieces 23 and 31. Through said cross pieces the wheel locking rod 25 extends with a working fit, said rod carrying a right angularly deflected rear end portion 27 furnished with an extremity 28 which is right angularly deflected in relation to the portion 27 in the proper direction for being projected between adjacent spokes 11a of the rear wheel 11 with which it is associated. The rod portion 27 is shown as a separate forged part having at its inner end a sleeve portion 29 which is keyed to the rear end part of the straight portion of the rod 25. Said rod projects at 30 and has its bearing in a frame member 31. Near its opposite end said rod has fixed to it a stop collar 32.

At its front end the locking rod 25 has a handle portion 35 which extends from the bar along a radius which is at less than a right angle to that of the main part of the locking arm 27. A handle rest rod 36 is mounted upon the front portion of the vehicle frame to slide longitudinally thereof, said rod 36 being furnished at its front end with a deflected handle 37 whereby it is manually slidable to and from the position wherein it may be utilized to support in a horizontal position the handle 35 of the wheel locking bar. The rod 36 has a deflected rear end portion 38, the two deflected portions of the rod cooperating with the vehicle frame to limit the sliding movement of the rod.

The truck shown has the usual tongue or traction bar 41, the lower extremity of which carries a counterbalancing weight 42, said bar being pivoted to the lower frame piece 43 to swing vertically.

Owing to the fact that the slidable handle rest member 36 is located at the front end of the truck bed or platform 10 the user of the truck can conveniently and quickly push said member rearwardly to release the bar 25, which will then immediately automatically turn to the wheel locking position. When the locking bar 25 is turned to the wheel locking position its handle portion 35 extends in a downwardly inclination so that its weight aids in maintaining the locking bar in its locked position. If desired, said handle portion may be weighted to make the locking action more positive.

I claim:

1. The combination, with the frame and ground wheels of a vehicle; of a bar turnably mounted upon said frame, said bar having one of its end portions deflected and positionable by the turning of the bar into a locking position between adjacent spokes of a wheel of the vehicle, the opposite end portion of said bar being laterally deflected thereby forming a handle means for turning the bar.

2. The combination, with the ground wheels and frame of a vehicle; of a bar turnably mounted upon said frame, said bar having a radially extending portion having a deflected extremity positionable by the turning of the bar into the space between adjacent spokes of the wheel of a vehicle, said bar having also a handle portion which extends at a downward inclination when the bar is in the wheel locking position, to aid in maintaining the bar in locking position.

3. The combination, with the ground wheels and frame of a vehicle; of a bar turnably mounted upon said frame, said bar having a radially extending portion having a deflected extremity positionable by the turning of the bar into the space between adjacent spokes of the wheel of a vehicle, said bar having also a handle at a downward inclination when the bar is in the wheel locking position, to aid in maintaining the bar in locking position, and a movable handle rest member carried by said frame, said member being adjustable to and from a position wherein it supports said handle portion in a horizontally extending position.

4. The subject matter of claim 3 and, said handle rest member consisting of a rod mounted upon the frame of the vehicle to slide to and from a position wherein it underlies said handle member when the latter extends horizontally.

5. The combination, with the frame and ground wheels of a vehicle; of a bar turnably mounted upon said frame, said bar having a laterally extending portion positionable by the turning of the bar into the space between adjacent spokes of a wheel of the vehicle, and, means projecting radially from said bar whereby said bar is normally maintained by gravity in a rotational position wherein it is in a locking relation to said wheel.

6. As an article of manufacture, in a turnable brake bar of the kind described, a rod having a main body portion and a radially directed portion for interposition between the spokes of a vehicle wheel, said radially directed portion having a sleeve part to fit over the body portion of the rod and carrying means to fix said sleeve part to the rod in the selected rotational position, said rod having a handle portion for use in rotating it to and from the wheel braking position.

7. The combination, with the frame and ground wheels of a vehicle; of a bar turnable about its axis, and bearings whereby said bar is supported upon said frame, said bar having a laterally extending locking portion positionable by the axial turning of the bar into the space between adjacent spokes of a wheel of the vehicle, and means to maintain the bar in its locked condition.

ANTHONY V. MANDEKIC.